(12) United States Patent
Termini et al.

(10) Patent No.: US 10,804,758 B2
(45) Date of Patent: Oct. 13, 2020

(54) PERMANENT MAGNET ROTOR FOR ROTATING ELECTRIC MACHINES AND METHOD FOR MANUFACTURING SUCH ROTOR

(71) Applicant: ABB Schweiz AG, Baden (CH)

(72) Inventors: Pietro Savio Termini, Vittuone (IT); Alessandro Castagnini, Novara (IT); Giovanni Tartaglino, Vittuone (IT); Michele Maggi, Vittuone (IT)

(73) Assignee: ABB Schweiz AG, Baden (CH)

( * ) Notice: Subject to any disclaimer, the term of this patent is extended or adjusted under 35 U.S.C. 154(b) by 98 days.

(21) Appl. No.: 15/770,439

(22) PCT Filed: Sep. 14, 2016

(86) PCT No.: PCT/EP2016/071730
§ 371 (c)(1),
(2) Date: Apr. 23, 2018

(87) PCT Pub. No.: WO2017/067720
PCT Pub. Date: Apr. 27, 2017

(65) Prior Publication Data
US 2018/0316232 A1 Nov. 1, 2018

(30) Foreign Application Priority Data
Oct. 22, 2015 (EP) .................................. 15191009

(51) Int. Cl.
*H02K 1/24* (2006.01)
*H02K 21/46* (2006.01)
(Continued)

(52) U.S. Cl.
CPC ......... *H02K 1/246* (2013.01); *H02K 15/0012* (2013.01); *H02K 15/03* (2013.01); *H02K 21/46* (2013.01); *H02K 19/14* (2013.01)

(58) Field of Classification Search
CPC ........ H02K 21/00; H02K 21/14; H02K 21/46; H02K 1/00; H02K 1/22; H02K 1/223;
(Continued)

(56) References Cited

U.S. PATENT DOCUMENTS 6,906,448 B2 * 6/2005 Yoshino ................. H02K 1/246
310/212
7,619,343 B2 11/2009 Weihrauch et al.
(Continued)

FOREIGN PATENT DOCUMENTS

CN 1819403 A2 8/2006
DE 102014201740 A1 8/2014
(Continued)

OTHER PUBLICATIONS

European Patent Office, International Search Report & Written Opinion issued in corresponding Application No. PCT/EP2016/071730, dated Dec. 9, 2016, 13 pp.
(Continued)

*Primary Examiner* — Tran N Nguyen
(74) *Attorney, Agent, or Firm* — Taft Stettinius & Hollister LLP; J. Bruce Schelkopf (57) ABSTRACT

A rotor for an interior permanent magnet machine (IPM), comprising a rotor core having a plurality of magnetically conductive laminations stacked in a rotor axial direction. The magnetically conductive laminations comprise cut-out portions forming a plurality of flux barriers (FB) radially alternated by flux paths (FP), at least a first part of the flux barriers (FB) housing permanent magnets, at least a second part of the flux barriers (FB) being filled with an electrically conductive and magnetically non-conductive material creating a cage inside the rotor core. The rotor further includes a first and a second short circuit ring positioned at the
(Continued)

opposite ends of the rotor core, the first short circuit ring being different from the second short circuit ring.

13 Claims, 9 Drawing Sheets

(51) Int. Cl.
    *H02K 15/00*     (2006.01)
    *H02K 15/03*     (2006.01)
    *H02K 19/14*     (2006.01)

(58) Field of Classification Search
    CPC ............ H02K 1/24; H02K 1/246; H02K 1/27; H02K 15/00; H02K 15/0012; H02K 15/03; F04C 18/3564; F04C 23/001; F04C 23/008; F04C 28/06; F04C 29/0085
    See application file for complete search history.

(56) References Cited

U.S. PATENT DOCUMENTS

| | | | |
|---|---|---|---|
| 2005/0253474 A1* | 11/2005 | Yanashima | ............ F04B 35/04 310/162 |
| 2008/0157620 A1* | 7/2008 | Longo | .................... H02K 1/223 310/156.78 |
| 2010/0011806 A1* | 1/2010 | Nam | .................... F04C 18/3564 62/510 |
| 2012/0267977 A1* | 10/2012 | Merwerth | ............ H02K 1/2766 310/156.53 |
| 2015/0372577 A1 | 12/2015 | Haussmann et al. | |

FOREIGN PATENT DOCUMENTS

| | | |
|---|---|---|
| EP | 2146419 A1 | 1/2010 |
| JP | 2001095183 A | 4/2001 |
| WO | 2005122362 A1 | 12/2005 |

OTHER PUBLICATIONS

European Patent Office, Extended Search Report issued in corresponding Application No. 15191009.8, dated Apr. 8, 2016, 9 pp.
Chinese Patent Office, Office Action issued in corresponding Application No. 201680059970.6, dated Aug. 30, 2019, 7 pp.
Indian Patent Office, Examination Report issued in corresponding Application No. 201847018253, dated Dec. 27, 2019, 5 pp.

\* cited by examiner

PERMANENT MAGNET ROTOR FOR ROTATING ELECTRIC MACHINES AND METHOD FOR MANUFACTURING SUCH ROTOR

The present invention relates to a rotor for a rotating machine, in particular to a rotor for an interior permanent magnet motor (IPM). More in particular, the present invention relates to a rotor for direct on-line PM-assisted synchronous reluctance machine including a squirrel-cage buried inside the rotor structure. In a further aspect, the present invention relates to a method for manufacturing such rotor. Moreover, the present invention also relates to a rotating electric machine, in particular an IPM machine, more in particular a PM-assisted synchronous reluctance machine, comprising such rotor.

Rotors for synchronous reluctance machines of known type are typically formed by a substantially cylindrical laminate stack having a plurality of magnetically conductive laminations which comprise flux conducting sections as well as flux barrier sections, thereby forming one or more pole pairs. The flux conducting sections and the flux barrier sections differ from one another to a varying degree of magnetic permeability, the section having a high magnetic conductivity being generally designated as the d-axis of the rotor, and the section having a comparably lower magnetic conductivity being generally designated as the q-axis of the rotor. An optimal torque yield is achieved when the d-axis has a magnetic conductivity as high as possible while the q-axis has a magnetic conductivity as low as possible. In practice, this is normally achieved by making cut-outs of proper shape in the magnetically conductive lamination along the q-axis; the cut-outs are filled with air, whereby the magnetic flux is inhibited in the direction of the q-axis and, as a consequence, the permeability decreases. It is also known that for line starting or direct-online (DOL) versions of the synchronous reluctance motors, there are solutions that foresee a squirrel cage structure buried inside the laminate stack and obtained by filling the cut-out portions of the magnetically conductive laminations with, e.g., aluminum or copper. From a manufacturing standpoint, this is normally obtained by using casting techniques, typically aluminum casting techniques, in order to create the cage structure inside the rotor core and short circuit rings at the opposite ends thereof. Moreover, it is also known to include permanent magnets in the rotor structure in order to increase the efficiency and improve the power factor of the machine. The permanent magnets are normally inserted in appropriate cut-out portions of the magnetically conductive laminations.

However, there are at least two important problems that can affect the manufacturing, and ultimately the design, of IPM motors.

Indeed, if the permanent magnets are inserted before the aluminium casting process, there is a strong risk that they would reach temperatures above the Curie temperature, with consequent damage of their magnetic properties. In fact, for example during casting the temperature of aluminium can be as high as 600° C. and, although the permanent magnets are not in direct contact with the liquid aluminium, they could reach very high temperatures.

Moreover, if the permanent magnets are inserted before the casting process, there is also a strong risk damaging or crumbling the permanent magnets due to the thermal expansion of the iron parts of the core.

As a further problem, with the conventional casting processes, the insertion of the permanent magnets into the appropriate cut-out portions of the magnetically conductive laminations after the casting process can be prevented by the presence of the short circuit rings.

Even though the short circuit rings can be applied to the rotor in a subsequent moment, i.e. after insertion of the permanent magnets in the flux barriers, such solution would be more complicated from a manufacturing standpoint and decrease the mechanical stiffness of the rotor. Hence, the present disclosure is aimed at providing a rotor for an IPM machine, as well as a method for manufacturing such rotor, which allows overcoming at least some of the above mentioned shortcomings.

In particular, the present invention is aimed at providing a rotor for an IPM machine with improved manufacturing strategy.

Thus, in a first aspect the present invention relates to a rotor for an interior permanent magnet machine (IPM) comprising a rotor core having a plurality of magnetically conductive laminations stacked in a rotor axial direction; the rotor according to the invention is characterized in that said magnetically conductive laminations comprise cut-out portions forming a plurality of flux barriers (FB) radially alternated by flux paths (FP), at least a first part of said flux barriers (FB) housing permanent magnets, at least a second part of said flux barriers (FB) being filled with an electrically conductive and magnetically non-conductive material creating a cage inside said rotor core, and it is further characterized in that it comprises a first and a second short circuit ring positioned at the opposite ends of said rotor core, said first short circuit ring being different from said second short circuit ring.

As better explained in the following description, thanks to the particular structure of the rotor for an interior permanent magnet machine according to the present invention, and in particular thanks to the asymmetric structure (i.e. different from each other) of the first and second short circuit rings the above-mentioned problems can be avoided.

In practice, thanks to the asymmetric structure of the short circuit rings, that can be designed so that each of them does not cover a portion of the flux barriers into which the permanent magnets are going to be inserted, it is possible to insert the permanent magnets inside the rotor core after the squirrel-cage has been created, thereby avoiding the above-mentioned problems and drawbacks of the conventional manufacturing technologies.

In other words, in the rotor according to the present invention, the first short circuit ring advantageously covers only a first portion of said first part of the flux barriers (FB) aimed at housing the permanent magnets while a second portion of said first part of the flux barriers (FB) is left free (i.e. uncovered) so as to allow insertion of the permanent magnets into said second portion. At the same time, the second short circuit ring covers only the second portion of said first part of the flux barriers (FB) aimed at housing the permanent magnets while the first portion of said first part of the flux barriers (FB) is left free (i.e. uncovered) so as to allow insertion of the permanent magnets into said first portion.

It is worth noting that the flux barriers (FB) can comprise further parts which are left void (i.e. not housing the permanent magnets or the squirrel cage).

Thus, once the cage and the short circuit rings are formed, a part of the permanent magnets can be inserted into the first portion from the side of the rotor where the second short circuit ring is placed, while the remaining part of the permanent magnets can be inserted into the second portion from the side of the rotor where the first short circuit ring is placed.

It is worth noting that with the design of the rotor according to the invention, the insertion of the permanent magnets is facilitated, since for each cavity one of its ends is completely free on either side of the rotor, while the opposite end of the cavity is closed by one of the short circuit rings thereby facilitating the positioning of the permanent magnets.

Moreover, the design of the rotor according to the invention allows inserting easily also resins into the portions of the flux barriers (FB) aimed at housing the permanent magnets in order to avoid permanent magnets movements and/or vibrations.

According to a preferred embodiment of the rotor according to the invention, said flux barriers (FB) are symmetrically positioned with respect to a q-axis of the rotor.

In such a case, in at least one of said flux barriers (FB), said first part housing permanent magnets is symmetrically positioned at the center of the flux barrier (FB), and the second part of the flux barrier (FB) comprises a first and a second sector positioned at opposite sides of said first part.

A preferred embodiment of the rotor according to the present invention foresees that said first short circuit ring covers a first portion of said first part of said flux barriers (FB) housing permanent magnets and said second short circuit ring covers a second portion of said first part of said flux barriers (FB) housing permanent magnets, said first portion being radially internal with respect to said second portion.

In other words, according to such embodiment, the permanent magnets housed radially more internal into the first part of the flux barriers (FB) are inserted from one side of the rotor, while the permanent magnets housed radially more external into the first part of the flux barriers (FB) are inserted from the opposite side of the rotor.

This can be achieved, for instance, by designing the first and second short circuit rings so that they have different internal and external diameters.

Moreover, the first and second short circuit rings can also have different thickness, and in general shape and thickness of the first and second short circuit rings can be tailored so as to balance the short circuit rings electrical resistances.

In a particular embodiment of the rotor according to the present invention, one or more of said flux barriers (FB) can be provided with transversal bridges delimiting said first and second parts of said flux barriers (FB). In practice, the presence of bridges allows delimiting the first part of the flux barriers (FB) into which the permanent magnets are intended to be housed as well as delimiting the second part of the flux barriers (FB) into which the squirrel-cage is casted.

A rotating machine, in particular an interior permanent magnet machine, more in particular a synchronous reluctance machine, comprising a rotor according to the present disclosure, is also part of the present invention.

In a further aspect, the present invention also relates to a method for manufacturing a rotor for an interior permanent magnet machine as described herein.

In particular, a first embodiment of a method for manufacturing a rotor according to the present invention comprises the following steps:
  forming a rotor core by providing a stack of magnetically conductive laminations comprising cut-out portions forming a plurality of flux barriers (FB) radially alternated by flux paths (FP);
  providing a first and a second closing laminations at opposite ends of said stack of magnetically conductive laminations, said first and a second closing laminations covering a first part of said flux barriers (FB);
  casting an electrically conductive and magnetically non-conductive material to form a cage inside a second part of said flux barriers (FB) and a first and a second terminal rings at opposite ends of said stack of magnetically conductive laminations;
  machining said first and second terminal rings and said first and second closing laminations to obtain a first and a second short circuit ring, said first short circuit ring being different from said second short circuit ring;
  positioning permanent magnets inside said first part of said flux barriers (FB).

In other words, with such a method it is possible to use conventional casting techniques to form the cage and the terminal rings.

Then, the first terminal ring and the first lamination are machined to uncover a second portion of said first part of said flux barriers (FB), and the second terminal ring and the second lamination are machined to uncover a first portion of said first part of said flux barriers (FB). Thus, a part of the permanent magnets can be positioned into a portion (the second portion) of the flux barriers (FB) from the side where the first short circuit ring is placed, while the remaining part of the permanent magnets can be positioned into another portion (the first portion) of the flux barriers (FB) from the side where the second short circuit ring is placed. For the purposes of the present invention, the term "positioning permanent magnets" includes also the injection of permanent magnet materials into the relevant part of a flux barrier. Alternatively, a second embodiment of a method for manufacturing a rotor according to the present invention comprises the following steps:
  forming a rotor core by providing a stack of magnetically conductive laminations comprising cut-out portions forming a plurality of flux barriers (FB) radially alternated by flux paths (FP);
  providing a first and a second closing laminations at opposite ends of said stack of magnetically conductive laminations, said first and a second closing laminations being different from one another and covering at least a portion of a first part of said flux barriers (FB);
  casting an electrically conductive and magnetically non-conductive material to form a cage inside a second part of said flux barriers (FB) and a first and a second short circuit ring at opposite ends of said stack of magnetically conductive laminations, said first short circuit ring covering a first portion of said first part of said flux barriers (FB) and said second short circuit ring covering a second portion of said first part of said flux barriers (FB);
  positioning permanent magnets inside said first part of said flux barriers (FB).

In this way, it is possible to avoid the machining step and obtain directly by casting a cage structure in which the first and second short circuit rings are different from each other and cover different portions of said flux barriers (FB), or put in other terms, leave uncovered (i.e. open) different portions of said flux barriers (FB). Moreover, the first and a second closing laminations are properly shaped so as to prevent flowing of the casting material into the portions of flux barriers aimed at housing the permanent magnets.

This can be advantageously obtained by making said first and second short circuit rings with different internal and external diameters, so that one of them covers portions of the flux barriers (FB) radially more internal, while the other covers portions of the flux barriers (FB) radially more external.

Also in this case, for the purposes of the present invention, the term "positioning permanent magnets" includes also the injection of permanent magnet materials into the relevant part of a flux barrier.

Further features and advantages of the present invention will be more clear from the description of preferred but not exclusive embodiments of a rotor for an interior permanent magnet (IPM) machine according to the invention, shown by way of examples in the accompanying drawings, wherein:

FIG. 1 is a perspective view of a first embodiment of a permanent magnet rotor for an IPM machine according to the invention;

In the following detailed description and in the attached figures, for sake of simplicity, the present invention will be described with reference to a rotor for a four poles synchronous reluctance electrical machine. The same structure and principles can of course be replicated in rotors with a different number of poles.

With reference to the attached figures, in its more general definition, a rotor for a synchronous reluctance machine, generally designated with the reference number 1 or 10, comprises a rotor core 2, 20 having a plurality of magnetically conductive laminations 3 which are stacked in a rotor axial direction.

The magnetically conductive laminations 3 comprise cut-out portions which form a plurality of flux barriers (FB) radially alternated by flux paths (FP).

A number of permanent magnets 4 are housed in at least a first part 51, 52 of said flux barriers (FB), while at least a second part 61, 62 of said flux barriers (FB) is filled with an electrically conductive and magnetically non-conductive material thereby creating a cage inside said rotor core 2, 20. In practice, the flux barriers (FB) form cavities 51, 52 into which permanent magnets 4 can be introduced, as well as cavities 61, 62 that can be filled with the cage-forming electrically conductive and magnetically non-conductive material.

For example, the electrically conductive and magnetically non-conductive material can be selected from Aluminum, Copper and electrically conductive resins.

In the embodiment shown in the attached figures, the flux barriers (FB) are symmetrically positioned with respect to a q-axis of the rotor 1, 10. According to this embodiment, the first parts 51, 52 of the flux barriers (FB) aimed at housing the permanent magnets 4 are symmetrically positioned at the center of the flux barrier (FB), while the second part of the flux barrier (FB), i.e. the part aimed at being filled with the cage-forming electrically conductive and magnetically non-conductive material, comprises a first sector 61 and a second sector 62 which are positioned at opposite sides of said first part 51, 52.

In practice, in such embodiment, the flux barriers (FB) are provided with transversal bridges 91, 92 which divide the flux barriers (FB) into three sections delimiting said first 51, 52 and second 61, 62 parts of said flux barriers (FB).

With reference to FIGS. 1 and 5-9, the rotor 1, 10 according to the present invention is characterized in that it comprises a first 5, 50 and a second 6, 60 short circuit ring which are positioned at the opposite ends of said rotor core 2, 20. As shown in the above-mentioned figures said first short circuit ring 5, 50 has a different shape with respect to said second short circuit ring 6, 60.

Figure 5:
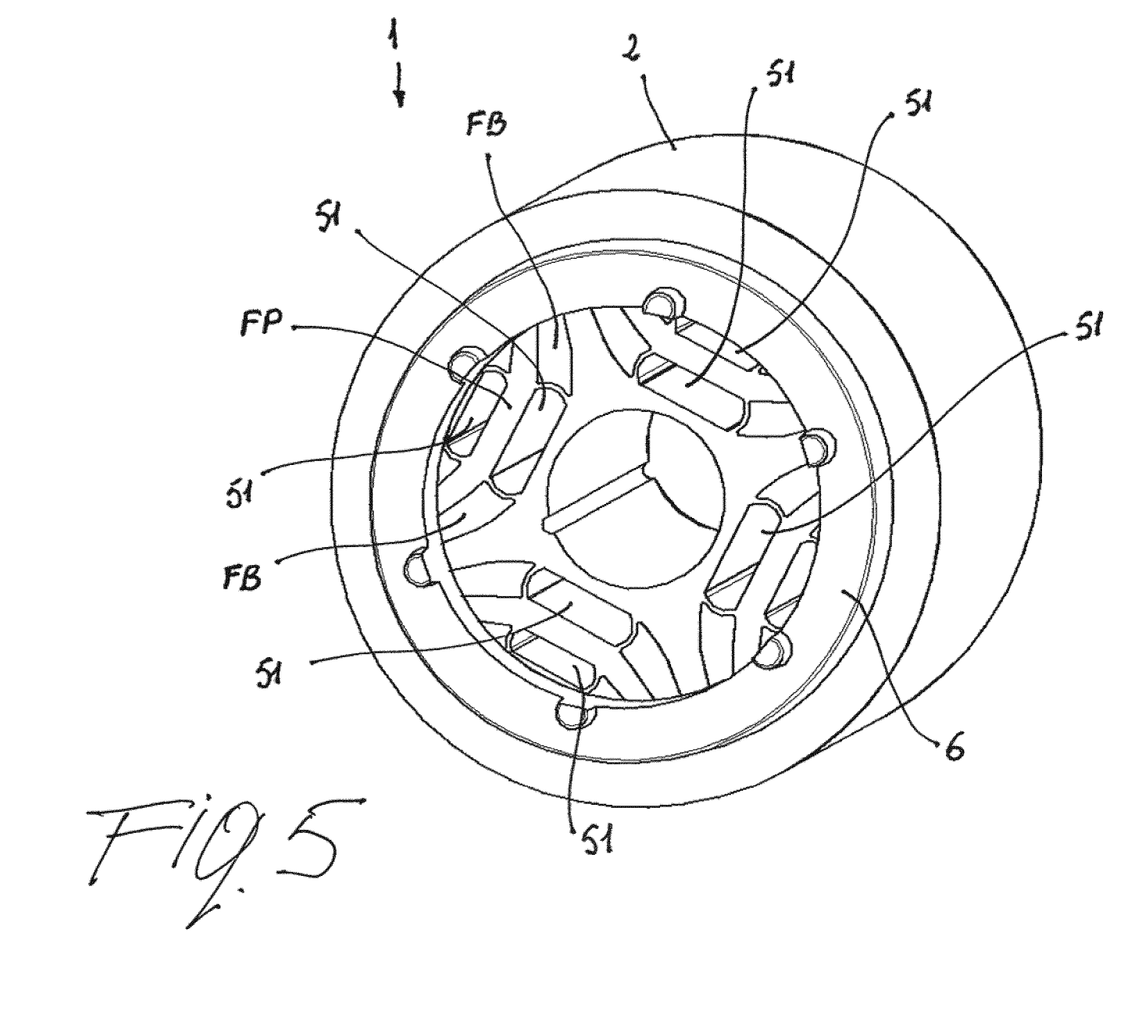
FIG. 5 is a perspective view of a third intermediate product of a first embodiment of a method for manufacturing the permanent magnet rotor of FIG. 1.
Figure 6:
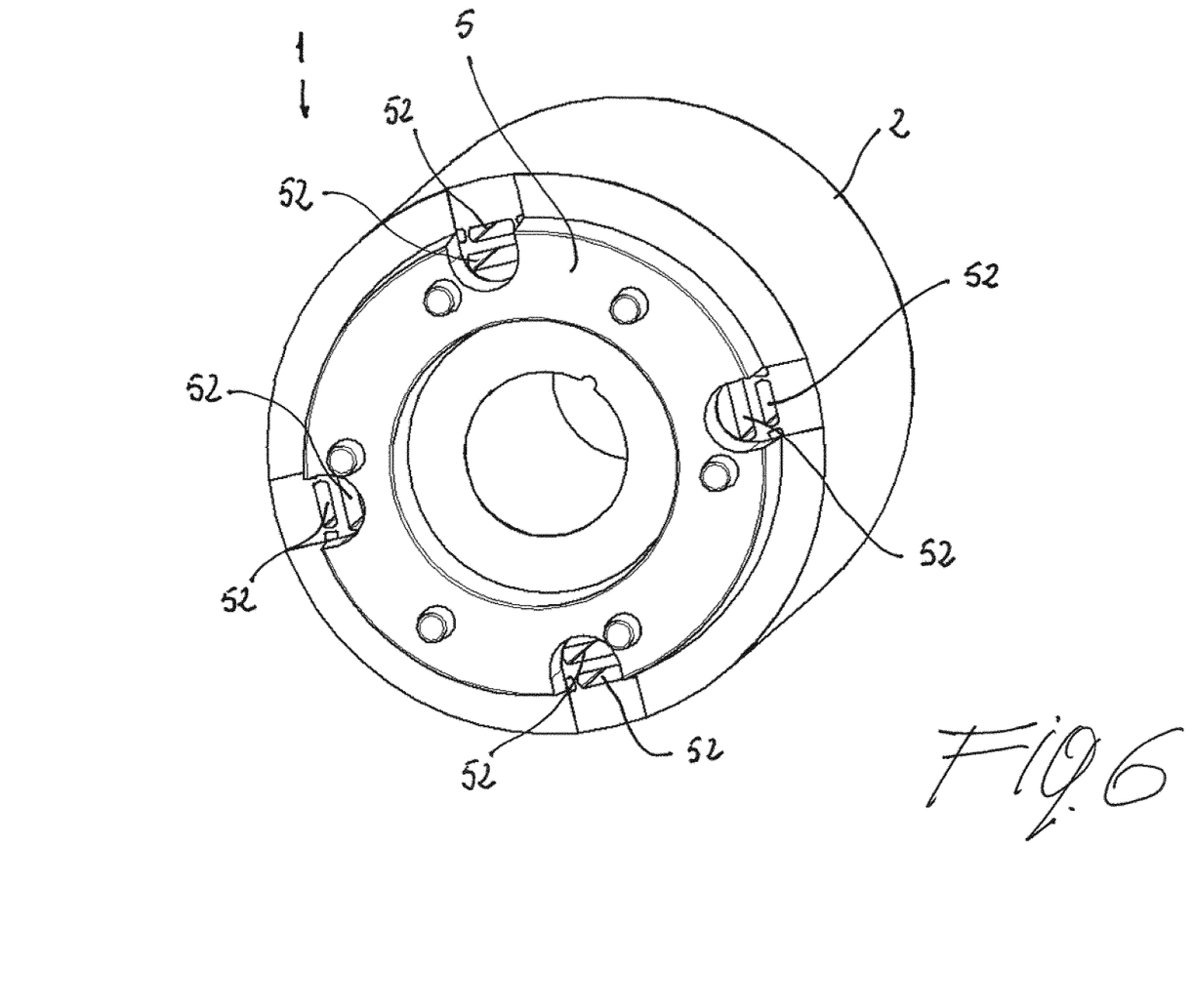
FIG. 6 is a perspective view of a fourth intermediate product of a first embodiment of a method for manufacturing the permanent magnet rotor of FIG. 1.

In particular, as shown in FIGS. 5 and 6, the first short circuit ring 5, 50 covers a first portion 51 of said flux barriers (FB) aimed at housing permanent magnets 4 and leave uncovered a second portion 52 of said flux barriers (FB) aimed at housing permanent magnets 4; at the same time the second short circuit ring 6 covers said second portion 52 of said flux barriers (FB) aimed at housing permanent magnets 4, and leave uncovered the first portion 51 of said flux barriers (FB) aimed at housing permanent magnets 4.

Figure 7:
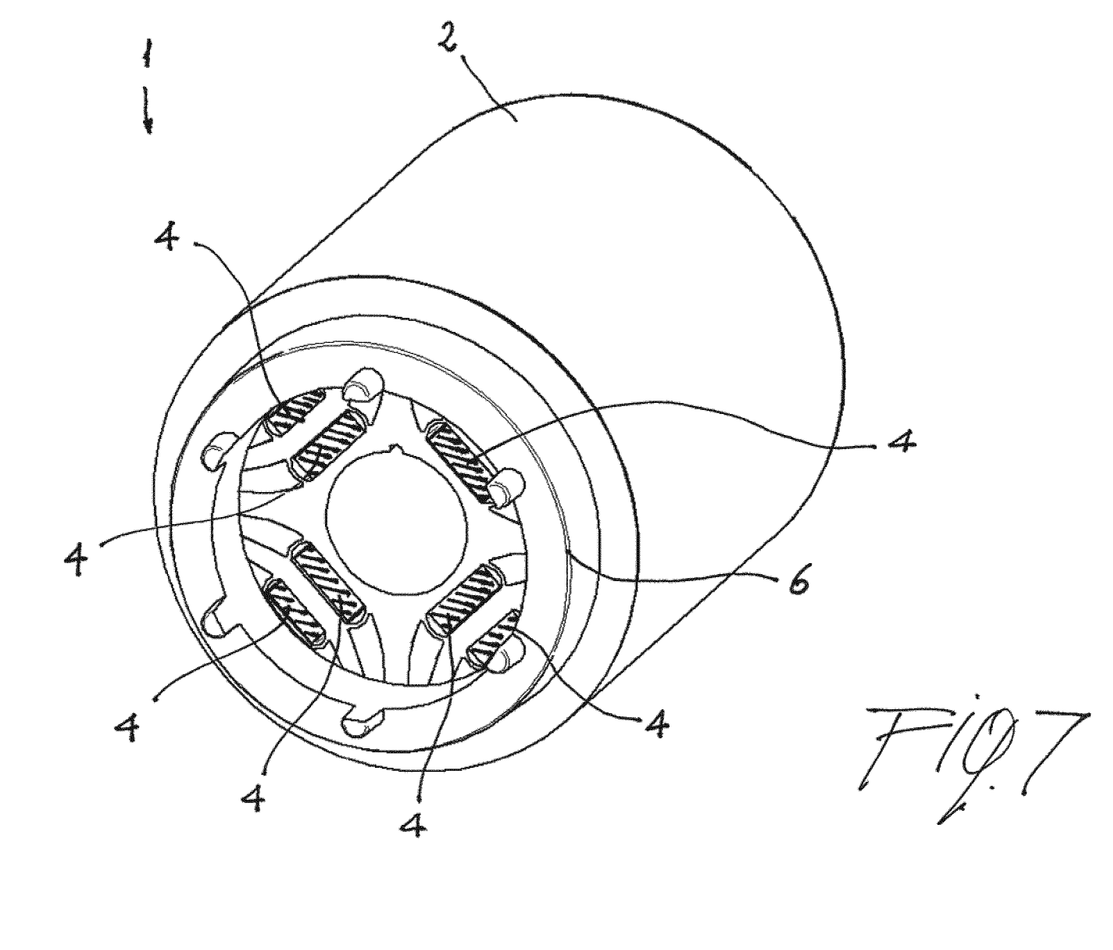
FIG. 7 is a perspective view showing a first side of the permanent magnet rotor of FIG. 1, with the permanent magnets inserted.
Figure 8:
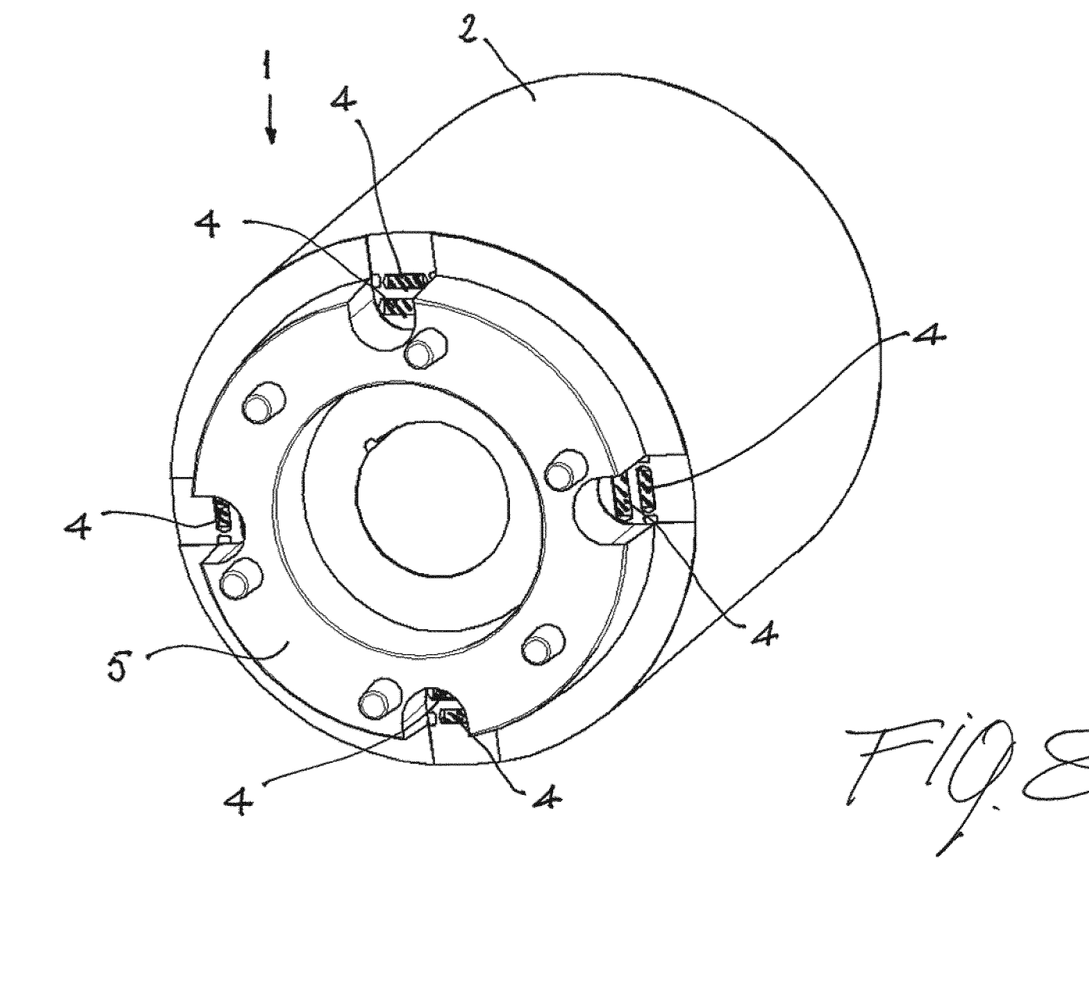
FIG. 8 is a perspective view showing a second side of the permanent magnet rotor of FIG. 1, with the permanent magnets inserted.

Therefore, as shown in FIGS. 7 and 8, permanent magnets 4 can be introduced or injected into the cavities 51 from the side where the second short circuit ring 6 is positioned, while the permanent magnets 4 can be introduced or injected into the cavities 52 from the side where the first short circuit ring 5 is positioned.

In the embodiment shown in the figures, the first portion 51 of said flux barriers (FB), which is covered by the first short circuit ring 5, is radially more internal with respect to the second portion 52 of said flux barriers (FB), which is covered by the second short circuit ring 6.

The rotor 1, 10 for a PM-assisted synchronous reluctance machine of the present invention can be easily manufactured according to the method described herein.

Figure 2:
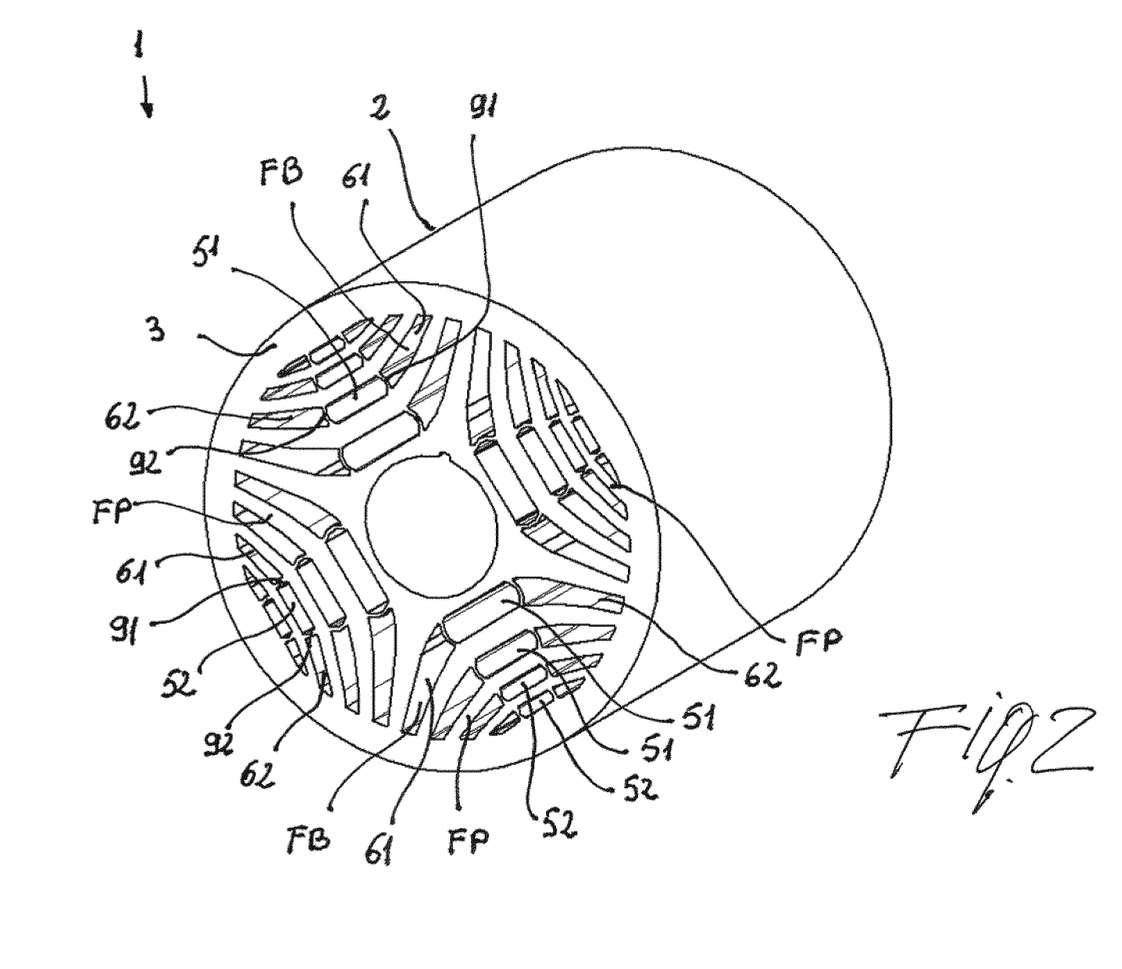
FIG. 2 is a perspective view of the lamination stack of the permanent magnet rotor of FIG. 1.

With reference to FIG. 2, a first embodiment of method of the present invention comprises the preliminary step of forming a rotor core 2 by providing a stack of magnetically conductive laminations 3 which comprise cut-out portions forming a plurality of flux barriers (FB) radially alternated by flux paths (FP). The flux barriers (FB) are divided into a first part (portions 51 and 52) aimed at housing permanent magnets, and in a second part (sectors 61 and 62) aimed at being filled with a cage-forming electrically conductive and magnetically non-conductive material.

Figure 3:
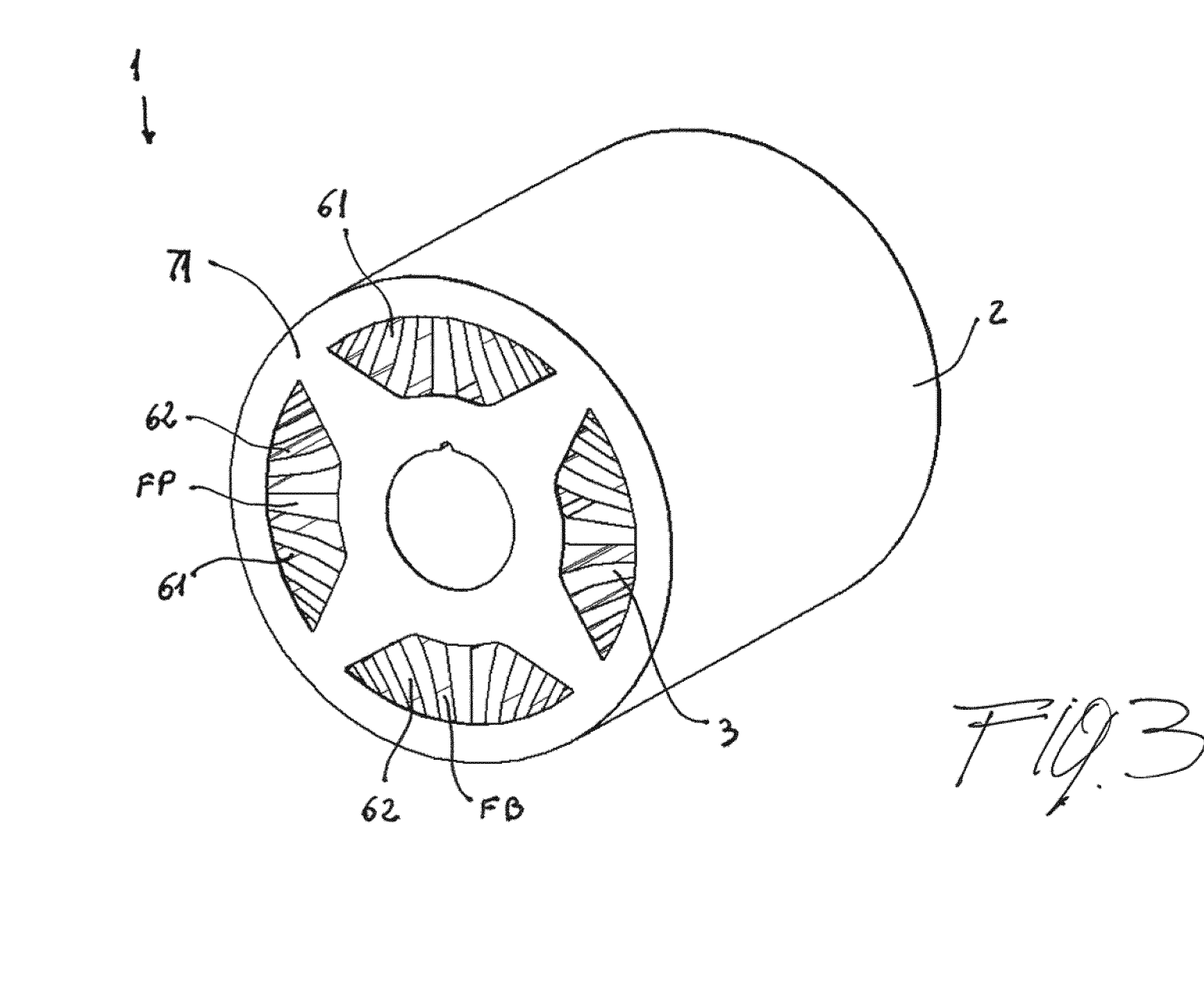
FIG. 3 is a perspective view of a first intermediate product of a first embodiment of a method for manufacturing the permanent magnet rotor of FIG. 1.
Figure 4:
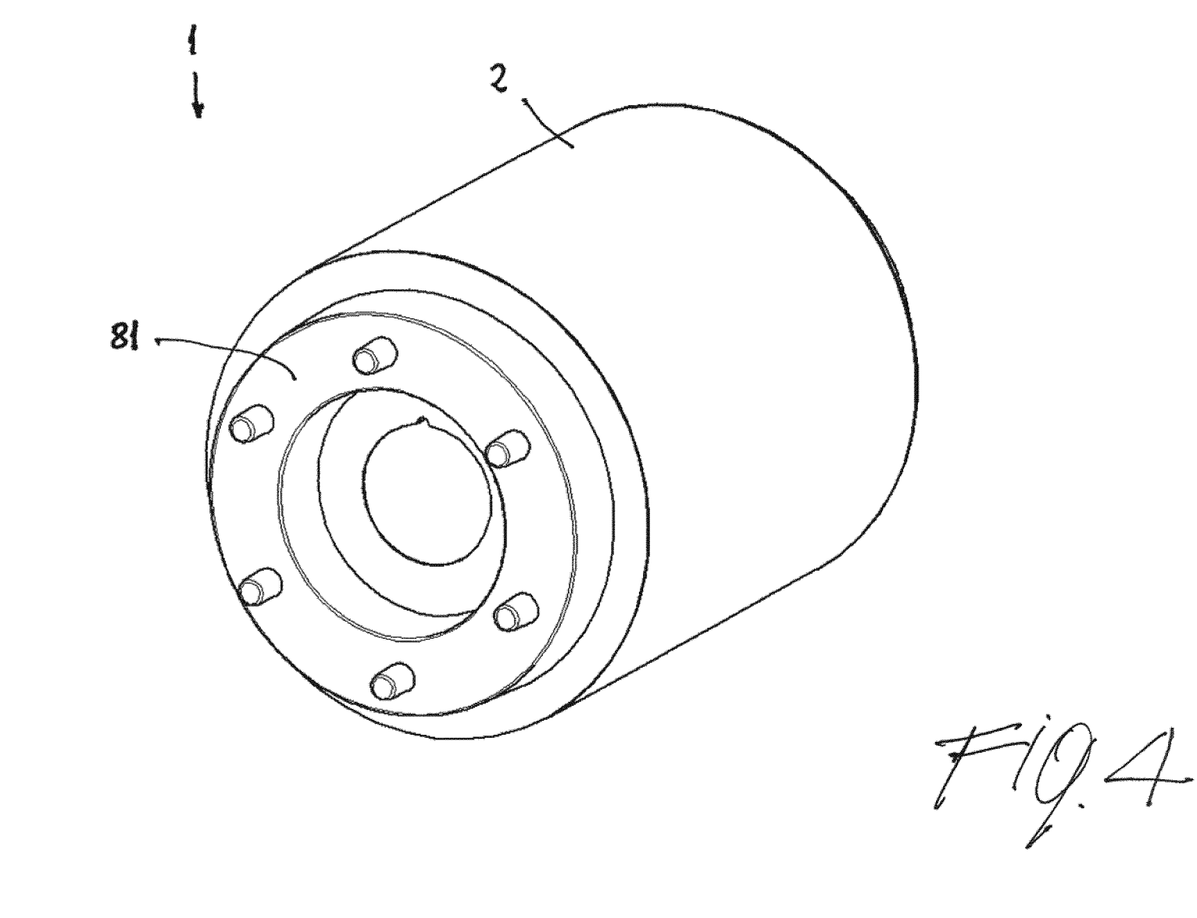
FIG. 4 is a perspective view of a second intermediate product of a first embodiment of a method for manufacturing the permanent magnet rotor of FIG. 1.

Then, with reference to FIG. 3, a first and a second closing laminations 71 are positioned at the opposite ends of said stack of magnetically conductive laminations 3 (only one closing lamination is shown in FIG. 3). As clearly illustrated by comparing FIG. 2 with FIG. 3, said first and a second closing laminations 71 cover the portions 51 and 52 of said flux barriers (FB), leaving uncovered at least a part of the sectors 61 and 62;

In the next step (FIG. 4), an electrically conductive and magnetically non-conductive material, typically aluminum, is casted to form a cage inside the sectors 61 and 62 of the flux barriers (FB) and to form a first and a second terminal rings 81 at opposite ends of said stack of magnetically conductive laminations 3 (only one terminal ring is shown in FIG. 4).

With reference to FIG. 5, the second terminal ring and the second closing laminations are machined to obtain the second short circuit ring 6. The machining operation is carried out so as to uncover at least the first portion 51 said flux barriers (FB).

With reference to FIG. 6, the first terminal ring and the second closing laminations are machined to obtain the first short circuit ring 5. The machining operation is carried out so as to uncover at least the second portion 52 said flux barriers (FB).

In this embodiment, the first portion 51 is radially internal with respect to said second portion 52. In general other machining procedures can be foreseen, provided that the cavities aimed at housing the permanent magnets are uncovered by the short circuit rings (i.e. open) on one side and covered by the short circuit rings (i.e. closed) on the opposite side.

The machining operations of the terminal rings 81 and the closing laminations 71 so as to obtain the short circuit rings 5 and 6 can be carried out in whatever order, as well as simultaneously. Finally, with reference to FIGS. 7 and 8, permanent magnets 4 are positioned or injected inside the cavities 51 and 52 of said flux barriers (FB), from opposite sides of the rotor core. In particular, the permanent magnets 4 are inserted or injected into the cavities 51 from the side where the second short circuit ring 6 is placed, while the permanent magnets 4 are inserted or injected into the cavities 52 from the side where the first short circuit ring 5 is placed.

A second embodiment of method of the present invention comprises the preliminary step of forming a rotor core by providing a stack of magnetically conductive laminations as previously described and as illustrated in FIG. 2.

Figure 9:
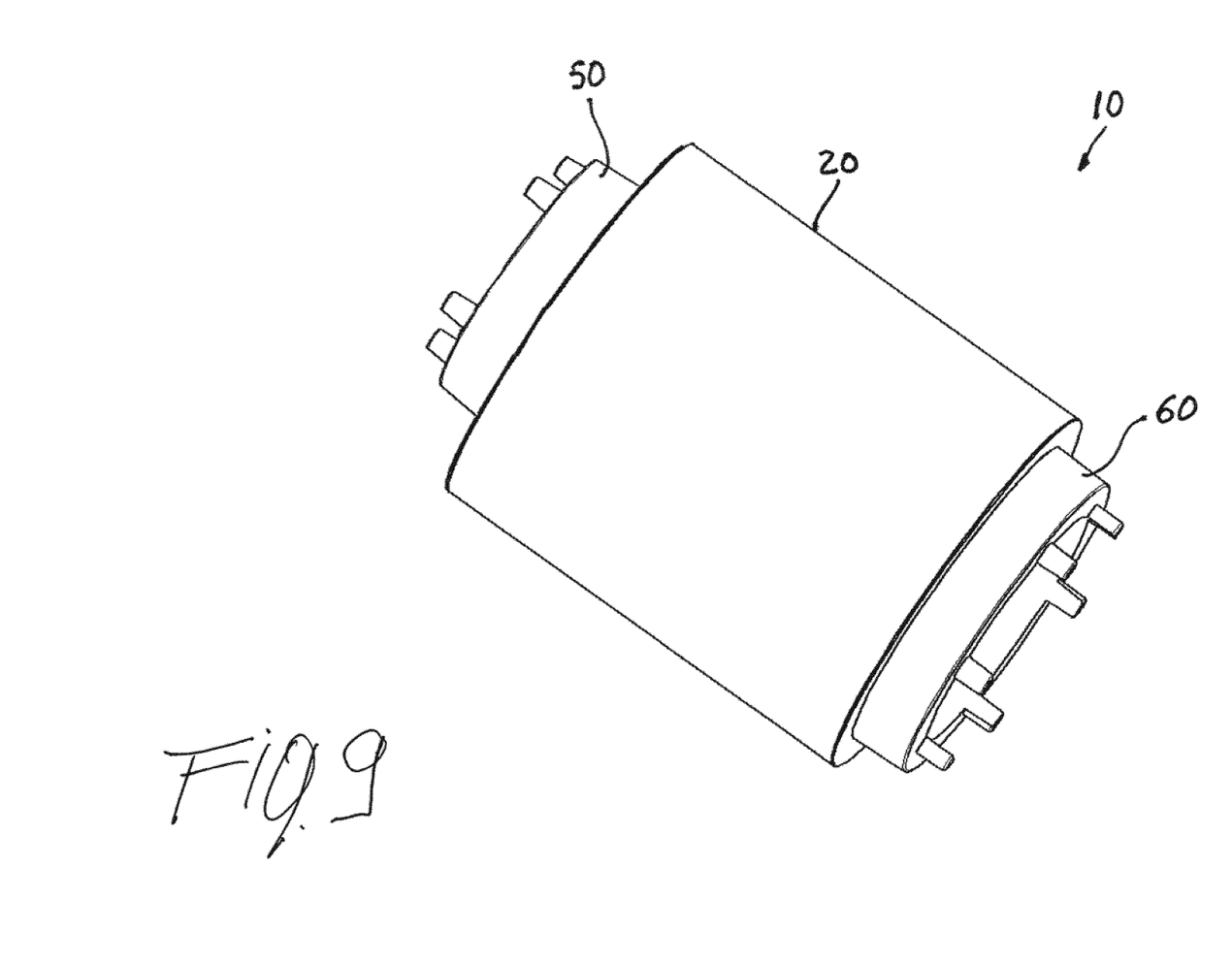
FIG. 9 is a perspective view of a second embodiment of a permanent magnet rotor for an IPM machine according to the invention.

Then, with reference to FIG. 9, an electrically conductive and magnetically non-conductive material, typically aluminum, is casted to form a cage inside at least part of the sectors 61 and 62 of the flux barriers (FB) and simultaneously a first 50 and a second 60 short circuit ring at opposite ends of said stack of magnetically conductive laminations 3.

Thus, according to this embodiment, the short circuit rings 50 and 60 are directly obtained with a proper shape during the casting process, thereby avoiding the machining operation.

In particular, by using properly shaped moulds and properly shaped closing laminations, the first short circuit ring 50 is shaped so as to cover the first portions 51 of said flux barriers (FB), while the second short circuit ring 60 is shaped so as to cover the second portions 52 of said flux barriers (FB).

In the embodiment shown in the figures, the first portions 51 of the flux barriers (FB) are radially internal with respect to the second portions 52. Consequently, as shown in FIG. 9, the first 50 and the second 60 short circuit rings have different internal and external diameters. In particular, the external diameter of the second short circuit ring 60 is greater than the external diameter of the first short circuit ring 50, since the former has to cover the second portions 52 and the latter has to leave uncovered said second portions 52. Also, the internal diameter of the second short circuit ring 60 is greater than the internal diameter of the first short circuit ring 50, since the former has to leave uncovered the first portions 51 and the latter has to cover said first portions 51.

In general, other shaping of the first 50 and second 60 short circuit rings can be foreseen, provided that the cavities aimed at housing the permanent magnets are uncovered by the short circuit rings (i.e. open) on one side and covered by the short circuit rings (i.e. closed) on the opposite side.

Finally, with reference to FIGS. 7 and 8, permanent magnets 4 are positioned inside the cavities 51 and 52 of the flux barriers (FB) from opposite sides of the rotor core in a manner similar to the previously described embodiment.

It is clear from the above description that the rotor for an IPM machine, in particular a PM-assisted synchronous reluctance machine, and the method for its manufacturing of this disclosure fully achieve the intended aims.

Indeed the design of the rotor of the present invention, in which asymmetric short circuit rings are present, allows the installation of permanent magnets without the risk of demagnetizing or damaging them.

In particular, the rotor of the present invention can be manufactured with standard processing techniques, i.e. conventional casting and simple machining. Alternatively, direct shaping of the short circuit rings by using properly shaped moulds during casting can be used.

In any case, the casting operation with the permanent magnets already installed within the rotor is avoided, thereby avoiding any risk of damaging the permanent magnets.

Moreover, the design of the rotor of the present invention allows to insert easily resin into the cavities housing the permanent magnets in order to avoid magnet movements and magnet vibrations.

A rotating machine, in particular an IPM machine, more in particular a PM-assisted synchronous reluctance machine, comprising a rotor as described herein is also part of the present invention.

Several variations can be made to the rotor for an IPM machine thus conceived, all falling within the scope of the attached claims. In practice, the materials used and the contingent dimensions and shapes can be any, according to requirements and to the state of the art.

The invention claimed is:

1. A rotor for an interior permanent magnet machine (IPM) comprising:
a rotor core having a plurality of magnetically conductive laminations stacked in a rotor axial direction, said magnetically conductive laminations comprising cut-out portions forming a plurality of flux barriers (FB) radially alternated by flux paths (FP), at least a first part of said flux barriers (FB) housing permanent magnets, at least a second part of said flux barriers (FB) being filled with an electrically conductive and magnetically non-conductive material creating a cage inside said rotor core, and further comprises a first short circuit ring and a second short circuit ring respectively positioned at respective axial opposite ends of said rotor core, said first short circuit ring being different from said second short circuit ring, wherein said first short circuit ring covers a portion of said first part of said flux barriers (FB) housing permanent magnets and said second short circuit ring covers a second portion of said first part of said flux barriers (FB) housing permanent magnets.

2. The rotor according to claim 1, wherein in at least one of said flux barriers (FB) said first part housing permanent magnets is symmetrically positioned at the center of the flux barrier (FB), said second part comprising first and second sectors positioned at opposite sides of said first part.

3. The rotor according to claim 1, wherein said first short circuit ring covers a first portion of said first part of said flux barriers (FB) housing permanent magnets and said second short circuit ring covers a second portion of said first part of said flux barriers (FB) housing permanent magnets, said first portion being radially internal with respect to said second portion.

4. The rotor according to claim 1, wherein said first and second short circuit rings have different thickness.

5. The rotor according to claim 1, wherein said first and second short circuit rings have different internal and external diameters.

6. The rotor according to claim 1, wherein one or more of said flux barriers (FB) are provided with transversal bridges delimiting said first and second parts of said flux barriers (FB).

7. A method for manufacturing a rotor to including a rotor core having a plurality of magnetically conductive laminations stacked in a rotor axial direction, said magnetically conductive laminations comprising cut-out portions forming a plurality of flux barriers (FB) radially alternated by flux paths (FP), at least a first part of said flux barriers (FB) housing permanent magnets, at least a second part of said flux barriers (FB) being filled with an electrically conductive and magnetically non-conductive material creating a cage inside said rotor core, and further comprises a first short circuit ring and a second short circuit ring respectively positioned at respective axial opposite ends of said rotor core, said first short circuit ring being different from said second short circuit ring, the method comprising:
    forming the rotor core by providing the stack of magnetically conductive laminations comprising cut-out portions forming a plurality of flux barriers (FB) radially alternated by flux paths (FP);
    providing a first closing lamination and a second closing lamination at opposite ends of said stack of magnetically conductive laminations, said first and second closing laminations covering a first part of said flux barriers (FB);
    casting the electrically conductive and magnetically non-conductive material to form the cage inside the second part of said flux barriers (FB) and a first terminal ring and a second terminal ring at opposite ends of said stack of magnetically conductive laminations;
    machining said first and second terminal rings and said first and second closing laminations to obtain the first and the second short circuit rings,
    positioning permanent magnets inside said first part of said flux barriers (FB).

8. The method according to claim 7, wherein the first terminal ring and the first lamination are machined to uncover a second portion of said first part of said flux barriers (FB), and the second terminal ring and the second lamination are machined to uncover a first portion of said first part of said flux barriers (FB).

9. The method according to claim 8, wherein said first portion is radially internal with respect to said second portion.

10. A method for manufacturing a rotor to including a rotor core having a plurality of magnetically conductive laminations stacked in a rotor axial direction, said magnetically conductive laminations comprising cut-out portions forming a plurality of flux barriers (FB) radially alternated by flux paths (FP), at least a first part of said flux barriers (FB) housing permanent magnets, at least a second part of said flux barriers (FB) being filled with an electrically conductive and magnetically non-conductive material creating a cage inside said rotor core, and further comprises a first short circuit ring and a second short circuit ring respectively positioned at respective axial opposite ends of said rotor core, said first short circuit ring being different from said second short circuit ring, the method comprising:
    forming the rotor core by providing the stack of magnetically conductive laminations comprising cut-out portions forming a plurality of flux barriers (FB) radially alternated by flux paths (FP);
    providing a first closing lamination and a second closing lamination at opposite ends of said stack of magnetically conductive laminations, said first and second closing laminations covering at least a portion of the first part of said flux barriers (FB);
    casting the electrically conductive and magnetically non-conductive material to form the cage inside the second part of said flux barriers (FB) and said first and second short circuit rings at opposite ends of said stack of magnetically conductive laminations, said first short circuit ring covering a first portion of said first part of said flux barriers (FB) and said second short circuit ring covering a second portion of said first part of said flux barriers (FB);
    positioning permanent magnets inside said first part of said flux barriers (FB).

11. The method according to claim 10, wherein said first portion is radially internal with respect to said second portion.

12. The method according to claim 10, wherein said first and second short circuit rings have different internal and external diameters.

13. A rotating machine comprising a rotor according to claim 1.

* * * * *